United States Patent
Minamisawa et al.

(10) Patent No.: US 11,985,402 B2
(45) Date of Patent: May 14, 2024

(54) OPTICAL UNIT WITH SHAKE CORRECTION FUNCTION

(71) Applicant: NIDEC SANKYO CORPORATION, Nagano (JP)

(72) Inventors: Shinji Minamisawa, Nagano (JP); Takeshi Sue, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 18/083,577

(22) Filed: Dec. 19, 2022

(65) Prior Publication Data
US 2023/0209158 A1 Jun. 29, 2023

(30) Foreign Application Priority Data
Dec. 28, 2021 (JP) ................. 2021-213627

(51) Int. Cl.
*H04N 23/51* (2023.01)
*H04N 23/52* (2023.01)
*H04N 23/68* (2023.01)

(52) U.S. Cl.
CPC ............. *H04N 23/51* (2023.01); *H04N 23/52* (2023.01); *H04N 23/682* (2023.01)

(58) Field of Classification Search
CPC ...... G02B 27/646; H04N 23/51; H04N 23/52; H04N 23/54; H04N 23/55; H04N 23/57; H04N 23/682; H04N 23/687
See application file for complete search history.

(56) References Cited

U.S. PATENT DOCUMENTS

| 11,856,296 | B2* | 12/2023 | Horio | H04N 23/687 |
| 2011/0298921 | A1* | 12/2011 | Osada | H04N 23/58 |
| | | | | 310/12.14 |
| 2018/0321504 | A1* | 11/2018 | Hu | G02B 7/09 |
| 2021/0041714 | A1* | 2/2021 | Sue | G02B 7/02 |
| 2021/0223661 | A1* | 7/2021 | Minamisawa | G02B 7/04 |
| 2021/0240003 | A1* | 8/2021 | Sazai | G02B 27/646 |
| 2023/0185053 | A1* | 6/2023 | Kim | H02K 41/0354 |
| | | | | 359/555 |
| 2023/0404856 | A1* | 12/2023 | Joyce | A61J 7/04 |

FOREIGN PATENT DOCUMENTS

JP 2020027134 2/2020

* cited by examiner

*Primary Examiner* — Amy R Hsu
(74) *Attorney, Agent, or Firm* — JCIPRNET

(57) ABSTRACT

In an optical unit with a shake correction function, a first inner-side wall surface disposed on an inner side of a first band-shaped portion of a circuit board in a Y-direction and a second inner-side wall surface disposed on an inner side of a second band-shaped portion of the circuit board in an X-direction are defined in an intermediate-member holder, and a first outer-side wall surface disposed on an outer side of the first band-shaped portion in the Y-direction and a second outer-side wall surface disposed on an outer side of the second band-shaped portion in the X-direction are defined on an outer-peripheral side covering portion. An interval between the first inner-side wall surface and the first outer-side wall surface is smaller than an interval between the second inner-side wall surface and the second outer-side wall surface.

5 Claims, 7 Drawing Sheets

OPTICAL UNIT WITH SHAKE CORRECTION FUNCTION

CROSS REFERENCE TO RELATED APPLICATION

The present invention claims priority under 35 U.S.C. § 119 to Japanese Application No. 2021-213627 filed Dec. 28, 2021, the entire content of which is incorporated herein by reference.

FIELD OF THE INVENTION

The disclosure relates to an optical unit with a shake correction function mounted in a mobile device or the like.

BACKGROUND

Optical units with a shake correction function mounted in a mobile device or the like have been known. A conventional optical unit includes a movable body having an optical module, a fixed body that rotatably supports the movable body, and a flexible printed circuit board which is pulled out from the optical module. The movable body is rotatable with respect to the fixed body with an optical axis of the optical module as a rotation center, and this optical unit enables shake correction in a rolling direction. This optical unit is also capable of the shake correction in a pitching direction and the shake correction in a yawing direction.

In the above optical unit, the fixed body has an external casing that is disposed on an outer peripheral side of the movable body. An outer shape of an external casing when viewed from an optical axis direction, which is a direction of the optical axis of the optical module, is a regular square. The flexible printed circuit board includes a band-shaped portion that is pulled around along two side surfaces adjacent to each other in a circumferential direction of four side surfaces that constitute an outer peripheral surface of the external casing. One end part of the band-shaped portion is fixed to a holder frame of the movable body, and the other end part of the band-shaped portion is fixed to the external casing. A gap is defined between the side surface of the external casing and the band-shaped portion.

The inventor of this application has developed an optical unit with a shake correction function that does not perform the shake correction in the rolling direction, but performs the shake correction in the pitching direction and the yawing direction. This optical unit with a shake correction function includes a camera module, and a circuit board such as a flexible printed circuit board is pulled out from the camera module. Since this optical unit with a shake correction function is installed in mobile devices such as smartphones in some cases, it is desirably small-sized.

In this optical unit with a shake correction function, the circuit board that is pulled out from the camera module moves with an operation of the camera module when the shake correction is performed in the pitching direction or the yawing direction. If a circuit board that moves with the operation of the camera module in performing the shake correction in the pitching direction or the yawing direction repeatedly contacts other components with the movement of the circuit board, there is a concern that the circuit board is damaged over time. In addition, if the circuit board is damaged, there is a concern that a photographing function of the camera module is impaired.

SUMMARY

An optical unit with a shake correction function of an exemplary embodiment of the disclosure includes a movable body having a camera module, an intermediate member rotatably holding the movable body, a fixed body rotatably holding the intermediate member, a magnetic drive mechanism to rotate the movable body with respect to the fixed body so that an optical axis of the camera module is inclined in an arbitrary direction, and a circuit board pulled out from the camera module, in which supposing that a direction orthogonal to the optical axis of the camera module disposed at a predetermined reference position is a first direction, a direction orthogonal to the optical axis of the camera module disposed at the reference position and the first direction is a second direction, one side in an optical axis direction being a direction of the optical axis of the camera module is a subject side, and a side opposite to the subject side is a counter-subject side, the fixed body includes an intermediate-member holder rotatably holding the intermediate member and an outer-peripheral side covering portion covering an outer peripheral side of the intermediate-member holder, the circuit board includes a module mounting portion mounted on an end surface on the counter-subject side of the camera module, a drawer portion pulled out from the module mounting portion to the outer peripheral side of the camera module, a band-shaped portion having an elongated band shape that is connected on one end part to the drawer portion and is pulled around on an outer peripheral side of the intermediate-member holder and an inner peripheral side of the outer-peripheral side covering portion, and a fixed portion connected to the other end part of the band-shaped portion and fixed to the outer peripheral surface of the intermediate-member holder, when viewed from the optical axis direction, when the optical axis of the camera module is at the reference position, an outer shape of the intermediate-member holder is a regular square or a rectangle, and four sides constituting the outer peripheral surface of the intermediate-member holder are parallel to the first direction or the second direction, supposing that one side in the two sides of the intermediate-member holder parallel to the first direction is a first side, and one side in the two sides of the intermediate-member holder parallel to the second direction is a second side, a width direction of the band-shaped portion is parallel to the optical axis direction when the optical axis of the camera module is at the reference position, the drawer portion is pulled out from the module mounting portion toward the one side in the first direction on the second side, the band-shaped portion is pulled around along the first side and the second side, the fixed portion is fixed to the outer peripheral surface of the intermediate-member holder on the first side, supposing that a part of the band-shaped portion disposed along the first side is a first band-shaped portion, and a part of the band-shaped portion disposed along the second side is a second band-shaped portion, in the intermediate-member holder, a planar-shaped first inner-side wall surface disposed on an inner side of the first band-shaped portion in the second direction and orthogonal to the second direction and a planar-shaped second inner-side wall surface disposed on an inner side of the second band-shaped portion in the first direction and orthogonal to the first direction are defined, on the outer-peripheral side covering portion, a planar-shaped first outer-side wall surface disposed on an outer side of the first band-shaped portion in the second direction and parallel to the first inner-side wall surface and a planar-shaped second outer-side wall surface disposed on an outer side of the second band-shaped portion in the first direction and parallel to the second inner-side wall surface are defined, and an interval between the first inner-side wall surface and the first outer-side wall surface in the second direction is smaller than an interval between the second inner-side wall surface and the second outer-side wall surface in the first direction.

The above and other elements, features, steps, characteristics and advantages of the present disclosure will become more apparent from the following detailed description of the preferred embodiments with reference to the attached drawings.

BRIEF DESCRIPTION OF THE DRAWINGS

Embodiments will now be described, by way of example only, with reference to the accompanying drawings which are meant to be exemplary, not limiting, and wherein like elements are numbered alike in several figures, in which.

DETAILED DESCRIPTION

In the following, embodiments of at least embodiments of the disclosure will be described with reference to the drawings.

Figure 1:
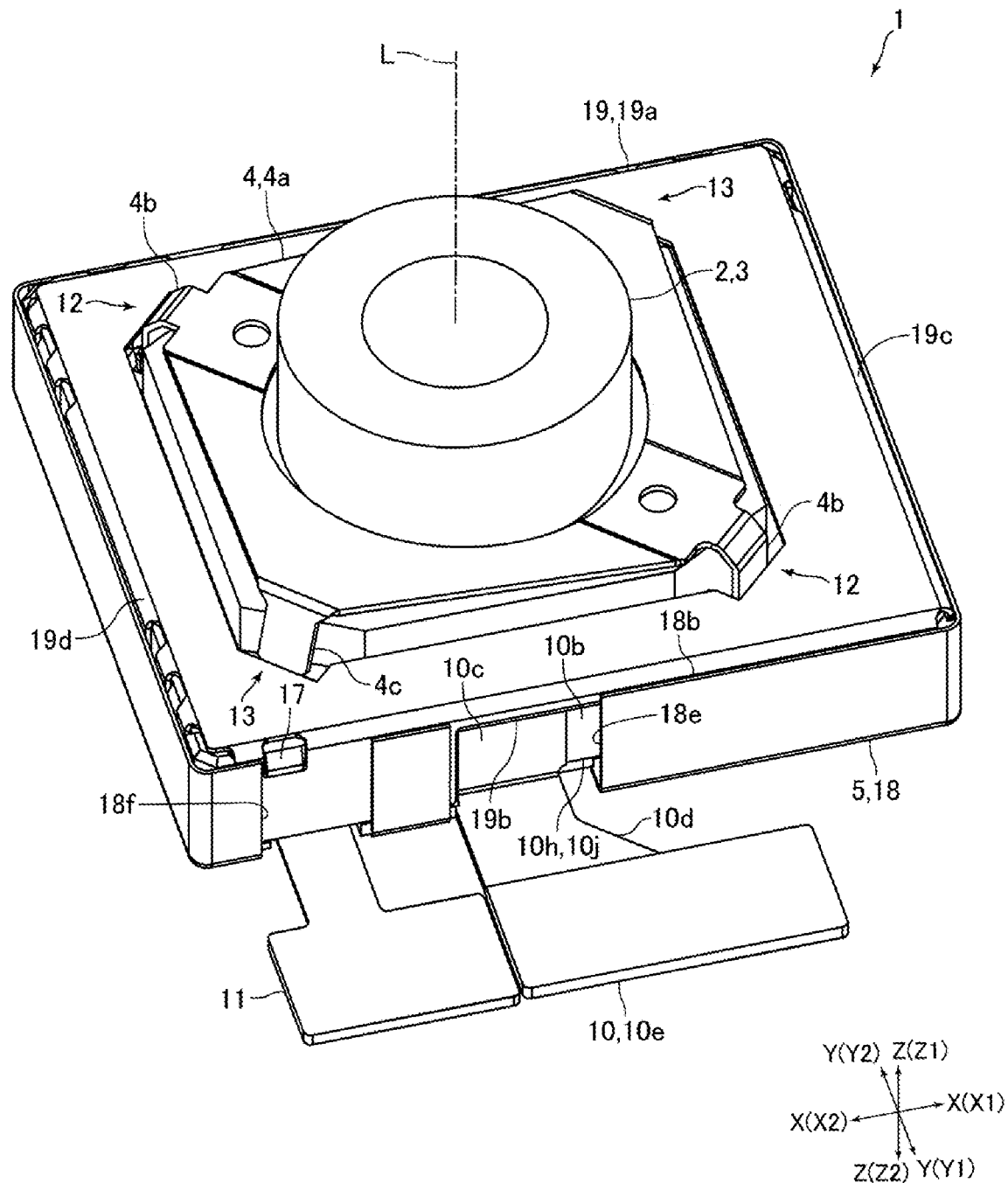
FIG. 1 is a perspective view of an optical unit with a shake correction function according to an embodiment of at least an embodiment of the disclosure.
Figure 2:
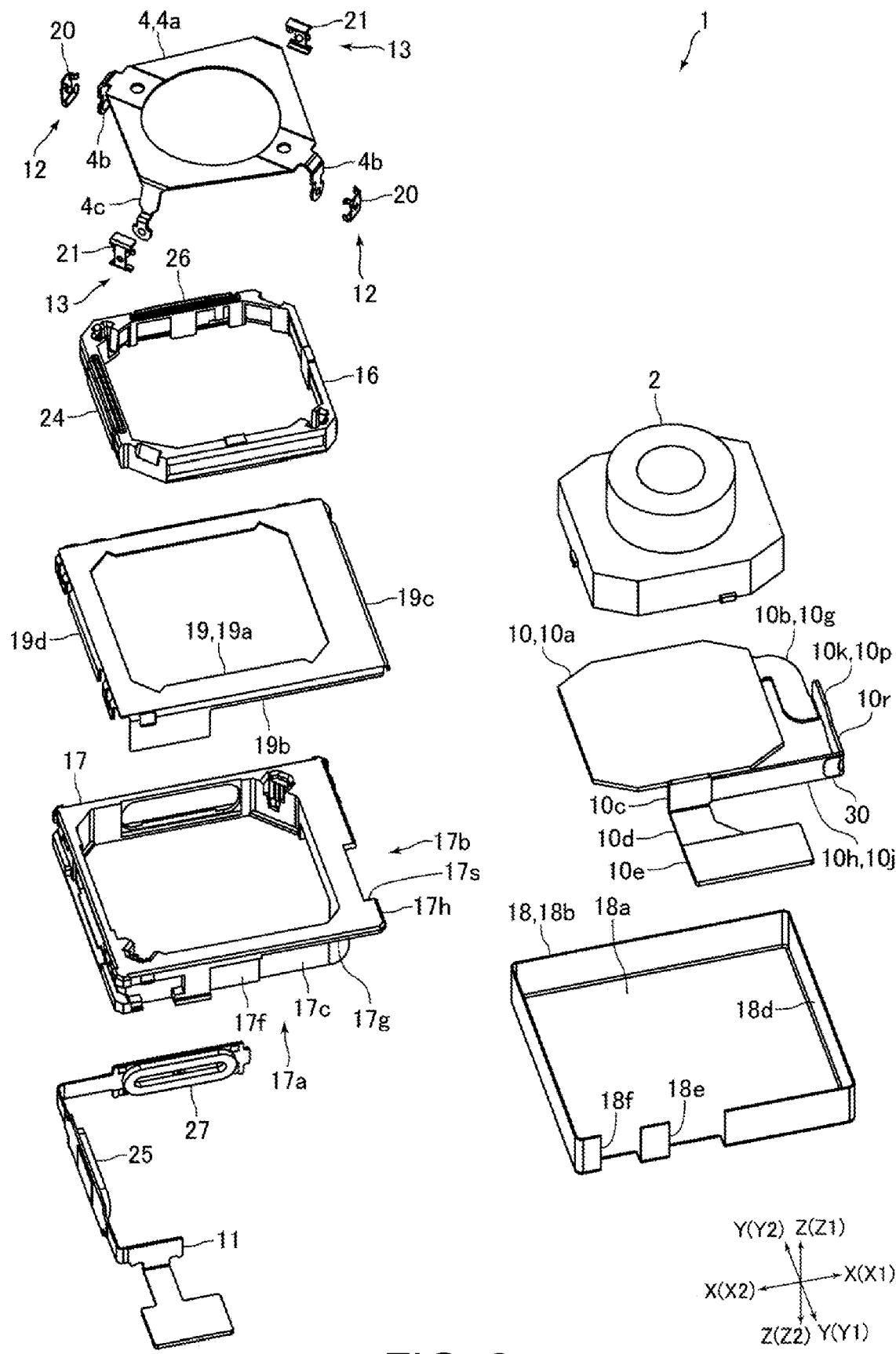
FIG. 2 is an exploded perspective view of the optical unit with a shake correction function shown in FIG. 1.
Figure 3:
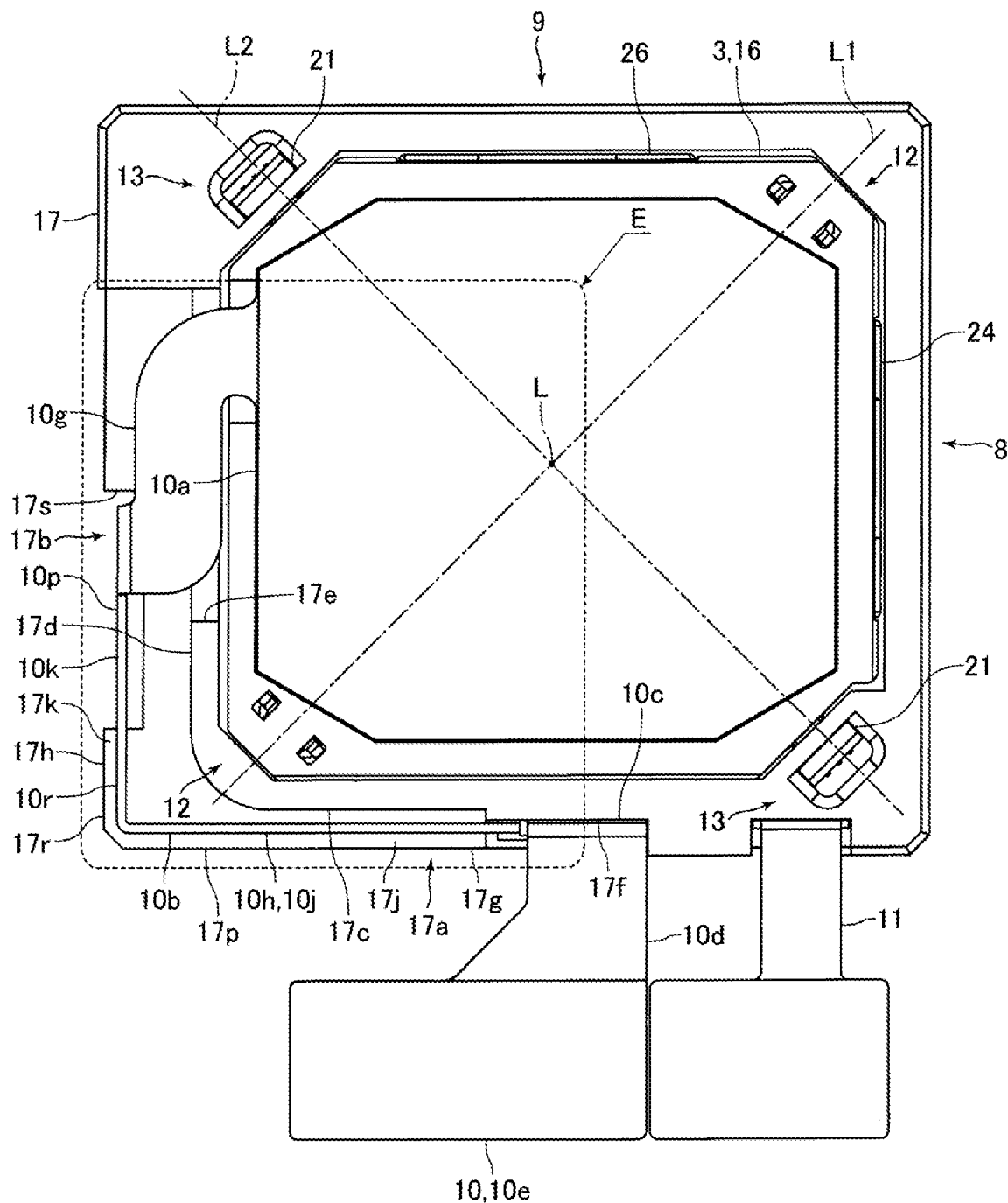
FIG. 3 is a bottom view of a state where a cover member is removed from the optical unit with a shake correction function shown in FIG. 1.
Figure 3:
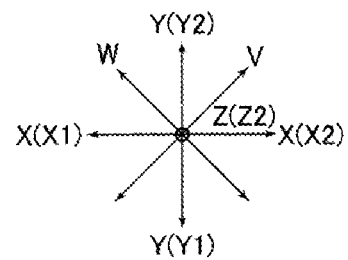

FIG. 1 is a perspective view of an optical unit 1 with a shake correction function according to an embodiment of at least an embodiment of the disclosure. FIG. 2 is an exploded perspective view of the optical unit 1 with a shake correction function shown in FIG. 1. FIG. 3 is a bottom view of a state where cover members 18, 19 are removed from the optical unit 1 with a shake correction function shown in FIG. 1.

In the following explanation, as shown in FIG. 1 and the like, each of three directions orthogonal to one another is referred to as an X-direction, a Y-direction, and a Z-direction, and the X-direction is referred to as a left-right direction, the Y-direction as a front-back direction, and the Z-direction as an up-down direction. Furthermore, an X1-direction side in FIG. 1 and the like, which is one direction side in the left-right direction, is referred to as a "right" side, while an X2-direction side in FIG. 1 and the like, which is a direction on a side opposite thereto, as a "left" side, a Y1-direction side in FIG. 1 and the like, which is one direction side in the front-back direction, as a "front" side, while a Y2-direction side in FIG. 1 and the like, which is a direction on a side opposite thereto, as a "back" side, and a Z1-direction side in FIG. 1 and the like, which is one direction side in the up-down direction, as an "upper" side, while a Z2-direction side in FIG. 1 and the like, which is a direction on a side opposite thereto, as a "lower" side.

The optical unit 1 with a shake correction function of this embodiment (hereinafter referred to as an "optical unit 1") is a small-sized and thin unit to be mounted in a mobile device such as a smartphone, for example, and includes a camera module 2 having a lens for photographing and an image pickup element. The optical unit 1 includes a shake correction function to avoid disturbances in a photographed image when a shake occurs during photographing. Specifically, the optical unit 1 includes a shake correction function in the pitching direction and the yawing direction. On the other hand, the optical unit 1 does not include a shake correction function in a rolling directional.

The optical unit 1 is provided having a thin and flat cuboid shape as a whole. The optical unit 1 in this embodiment is provided to have a regular-square shape when viewed from the optical axis direction, which is the direction of an optical axis L of the camera module 2. Four side surfaces of the optical unit 1 are parallel to a ZX plane, which is constituted by the left-right direction and the up-down direction or a YZ plane, which is constituted by the front-back direction and the up-down direction.

The optical unit 1 has a movable body 3 having the camera module 2, an intermediate member 4 that rotatably holds the movable body 3, and a fixed body 5 that rotatably holds the intermediate member 4 (see FIG. 1). The movable body 3 is able to be rotated with respect to the intermediate member 4 with a first crossing direction (direction V in FIG. 3) that intersects the optical axis L of the camera module 2 as an axis direction of rotation. In other words, the movable body 3 is rotatable with respect to the intermediate member 4 around a first axis L1 (see FIG. 3) with the first crossing direction as the axial direction. The first crossing direction in this embodiment is orthogonal to the optical axis L.

The intermediate member 4 is able to be rotated with respect to the fixed body 5 with a second crossing direction (W-direction in FIG. 3), which intersects the first crossing direction and intersects the optical axis L of the camera module 2, as the axial direction of rotation. In other words, the intermediate member 4 is able to be rotated with respect to the fixed body 5 with a second axis L2 (see FIG. 3), which has the second crossing direction as its axis direction, as a rotation center. In this embodiment, the second crossing direction is orthogonal to the first crossing direction. As described above, a two-axis gimbal mechanism is constituted between the movable body 3 and the fixed body 5.

In this embodiment, when no current is supplied to a first drive coil 25 and a second drive coil 27 described below, the movable body 3 and the intermediate member 4 are disposed at predetermined reference positions, and the optical axis L of the camera module 2 is disposed at a predetermined reference position. When the movable body 3 and the intermediate member 4 are disposed at the reference positions and the optical axis L of the camera module 2 is at the reference position, the optical axis direction of the camera module 2 matches the up-down direction.

The left-right direction (X-direction) in this embodiment is the first direction orthogonal to the optical axis L of the camera module 2 disposed at the reference position. Moreover, the front-back direction (Y-direction) is the second direction orthogonal to the optical axis L of the camera module 2 disposed at the reference position and the left-right direction, which is the first direction. The inclination of the optical axis L of the camera module 2 with respect to the up-down direction is slight when the shake correction is performed in the pitching direction and the yawing direction. Therefore, the optical axis direction of the camera module 2 substantially matches the up-down direction.

Moreover, when the movable body 3 is disposed at the predetermined reference position, the second crossing direction (W-direction) is orthogonal to the optical axis L. In other words, when the movable body 3 is disposed at the predetermined reference position and is not rotated with respect to the intermediate member 4, the second crossing direction is orthogonal to the optical axis L. On the other hand, when the movable body 3 is rotated with respect to the intermediate member 4, the second crossing direction intersects the optical axis L, but not at a right angle. The second crossing direction (W-direction) is a direction shifted in a counterclockwise direction in FIG. 3 by approximately 45° with respect to the front-back direction when viewed from the lower side.

The optical unit 1 includes magnetic drive mechanisms 8, 9 to rotate the movable body 3 with respect to the fixed body 5 so that the optical axis L of the camera module 2 is inclined in an arbitrary direction (see FIG. 3). Moreover, the optical unit 1 includes a circuit board 10, which is pulled out from the camera module 2, and a circuit board 11 on which a first drive coil 25, which will be described later and constitutes a part of the magnetic drive mechanism 8, and the second drive coil 27, which will be described later and constitutes a part of the magnetic drive mechanism 9, are mounted. A first fulcrum portion 12, which is a fulcrum of rotation of the movable body 3 with respect to the intermediate member 4, is disposed at both end parts of the intermediate member 4 in the first crossing direction. A second fulcrum portion 13, which is a fulcrum of rotation of the intermediate member 4 with respect to the fixed body 5, is disposed at both end parts of the intermediate member 4 in the second crossing direction.

The movable body 3 is provided having a substantially cuboid shape, which is flat and small in thickness in the optical axis direction as a whole. The movable body 3 has a holder 16 to which the camera module 2 is fixed. The holder 16 is provided of a resin material. The holder 16 is provided having a regular-square frame shape, and when viewed from the optical axis direction in a state where the movable body 3 and intermediate member 4 are disposed at the reference position, an outer shape of the holder 16 has a regular-square shape. Moreover, when the movable body 3 and the intermediate member 4 are disposed at the reference positions, two of the four sides that constitute the outer peripheral surface of the holder 16, which has a regular-square outer shape, are parallel to the front-back direction, and the remaining two sides are parallel to the left-right direction.

The camera module 2 is fixed to an inner peripheral surface of the holder 16 so that the outer peripheral side of the camera module 2 is covered by the holder 16. As described above, the camera module 2 includes a lens and an image pickup element. The image pickup element is disposed on a lower end side of the camera module 2, and a subject disposed on an upper side of the camera module 2 is photographed by the camera module 2.

As described above, the inclination of the optical axis L of the camera module 2 with respect to the up-down direction when the shake correction in the pitching direction and the yawing direction is performed is slight, and the optical axis direction of the camera module 2 substantially matches the vertical direction. Therefore, supposing that one side in the optical axis direction of the camera module 2 (specifically, the side on which the subject is disposed in the optical axis direction of the camera module 2) is the subject side and the side opposite to the subject side (specifically, the side where the image pickup element is disposed in the optical axis direction of the camera module 2) is the counter-subject side, the subject side substantially matches the upper side and the counter-subject side substantially matches the lower side.

The intermediate member 4 is provided of a metal material such as stainless steel. Moreover, the intermediate member 4 is a plate spring defined by a metal plate having a spring characteristic bent into a predetermined shape. The intermediate member 4 is constituted by a base portion 4a that is disposed above the holder 16, two arm portions 4b that extend from the base portion 4a toward both sides in the first crossing direction, and two arm portions 4c that extend from the base portion 4a toward the both sides in the second crossing direction. The base portion 4a is provided having a substantially regular-square frame shape. An upper end part of the camera module 2 is disposed on an inner peripheral side of the base portion 4a.

Distal end sides of the arm portions 4b and 4c are bent toward lower sides. The arm portions 4b are disposed on the inner peripheral side of the holder 16. The arm portions 4c are disposed on the outer peripheral side of the holder 16. Moreover, the arm portions 4c are disposed on the inner peripheral side of the case body 17, which will be described below, which constitutes a part of the fixed body 5. A hemispherical recess part in which a part of a spherical body that constitutes a part of the first fulcrum portion 12 is disposed is provided on the distal end part of the arm portion 4b. A hemispherical recess part in which a part of a spherical body that constitutes a part of the second fulcrum portion 13 is disposed is provided on the distal end part of the arm portion 4c.

The fixed body 5 includes the frame-shaped case body 17 that is disposed on an outer side of the movable body 3 and the intermediate member 4, a cover member 18 which covers a side surface and a lower surface of the case body 17, and a cover member 19 which covers an upper surface of the case body 17. The case body 17 is provided of a resin material. The intermediate member 4 is rotatably held in the case body 17. The case body 17 in this embodiment is an intermediate member holding portion that rotatably holds the intermediate member 4.

The case body 17 is provided having a flat square-cylinder shape with openings at both ends in the up-down direction. The upper surface of the case body 17 is a plane orthogonal to the up-down direction. The shape of the case body 17 when viewed from the up-down direction has a regular-square frame shape. In other words, when the optical axis L of the camera module 2 is at the reference position, the outer shape of the case body 17 has a regular-square shape when viewed from the optical axis direction of the camera module 2. When viewed from the up-down direction, two sides of the four sides that constitute the outer peripheral surface of the case body 17, which has a regular-square outer shape, are parallel to the front-back direction, while the remaining two sides are parallel to the left-right direction. In other words, when viewed from the up-down direction, the four sides that constitute the outer peripheral surface of the case body 17 are parallel to the front-back direction or the left-right direction. A more specific configuration of the case body 17 will be described below.

The cover member 18 is provided having a square-cylinder shape with a bottom having a bottom portion 18a provided with a flat plate of a regular-square shape and a square-cylindrical cylinder portion 18b standing upward from the bottom portion 18a. An outer shape of the cover member 18 when viewed from the up-down direction is a regular square. When viewed from the up-down direction, two sides of the four sides that constitute the outer peripheral surface of the cover member 18, which has a regular-square outer shape, are parallel to the front-back direction, while the remaining two sides are parallel to the left-right direction.

The bottom portion 18a constitutes a bottom surface of the optical unit 1. The upper surface of the bottom portion 18a is a plane orthogonal to the up-down direction. The cylinder portion 18b constitutes the side surface of the optical unit 1. The cylinder portion 18b covers the outer peripheral side of the case body 17. Specifically, the cylinder portion 18b covers the outer peripheral side of the case body 17 substantially in the whole region in the up-down direction. The cylinder portion 18b in this embodiment is the outer-peripheral side covering portion that covers the outer peripheral surface of the case body 17, which is the intermediate-member holding portion. A more specific configuration of the cover member 18 will be described below.

A cover member 19 is mainly constituted by a flat plate-shaped covering portion 19a that covers an upper surface of the case body 17. The cover member 19 is fixed to an upper end part of the case body 17. The covering portion 19a is provided having a regular-square frame shape. An outer shape of the cover member 19 when viewed from the up-down direction is a regular square. When viewed from the up-down direction, two sides of the four sides that constitute the outer peripheral surface of the cover member 19, which has a regular-square outer shape, are parallel to the front-back direction, while the remaining two sides are parallel to the left-right direction. The camera module 2 and a part of the intermediate member 4 are disposed on the inner peripheral side of the covering portion 19a. A lower surface of the covering portion 19a is in contact with the upper surface of the case body 17.

To a front end of the covering portion 19a, a front surface portion 19b, which extends downward, is connected. Both front and rear surfaces of the front surface portion 19b are planes orthogonal to the front-back direction. A part of the front surface portion 19b covers a part of the circuit board 11 from the front side. A right end of the covering portion 19a is connected to a right surface portion 19c, which slightly extends downward. A left end of the covering portion 19a is connected to a left surface portion 19d, which slightly extends downward. Both left and right surfaces of the right surface portion 19c and the left surface portion 19d are planes orthogonal to the left-right direction. To a rear end of the covering portion 19a, a rear surface portion, which slightly extends downward, is connected. Both front and rear surfaces of the rear surface portion are planes orthogonal to the front-back direction. A part of the right surface portion 19c, a part of the left surface portion 19d, and a part of the rear surface portion are engagement portions engaged with the case body 17.

The first fulcrum portion 12 includes a support member 20 fixed to the holder 16 and a spherical body that is fixed to the support member 20. A part of the spherical body fixed to the support member 20 is disposed in the recess part provided at a distal end part of the arm portion 4b. The spherical body is in contact with a bottom surface of the recess part of the arm portion 4b from the outer side in the first crossing direction with a predetermined contact pressure by the spring characteristic of the arm portion 4b. The second fulcrum portion 13 includes a support member 21 fixed to the case body 17 and a spherical body fixed to the support member 21. A part of the spherical body fixed to the support member 21 is disposed in the recess part provided at a distal end part of the arm portion 4c. The spherical body is in contact with a bottom surface of the recess part of the arm portion 4c from the outer side in the second crossing direction with a predetermined contact pressure by the spring characteristic of the arm portion 4c.

The magnetic drive mechanism 8 includes a first drive magnet 24 and the first drive coil 25 that are disposed to oppose each other in the left-right direction. The magnetic drive mechanism 9 includes a second drive magnet 26 and the second drive coil 27 that are disposed to oppose each other in the front-back direction. The first drive magnet 24 and the second drive magnet 26 are provided having a rectangular flat-plate shape. The first drive coil 25 and the second drive coil 27 are, for example, air-core coils defined by a conductor wound around an air-core.

The first drive magnet 24 is disposed in a recess part provided in a left side surface of the holder 16 and is fixed to a left surface side of the holder 16. The first drive coil 25 is disposed in a through hole defined in the left surface part of the case body 17. Moreover, the first drive coil 25 is mounted on the circuit board 11. The magnetic drive mechanism 8 rotates the movable body 3 with respect to the fixed body 5 with an axis orthogonal to the optical axis L of the camera module 2 and parallel to the front-back direction as the rotation center.

The second drive magnet 26 is disposed in a recess part provided in a rear side surface of the holder 16 and is fixed to a rear surface side of the holder 16. The second drive coil 27 is disposed in a through hole defined in the rear side part of the case body 17. Moreover, the second drive coil 27 is mounted on the circuit board 11. The magnetic drive mechanism 9 rotates the movable body 3 with respect to the fixed body 5 with an axis orthogonal to the optical axis L of the camera module 2 and parallel to the left-right direction as the rotation center.

The circuit board 11 is a flexible printed circuit board. The circuit board 11 is pulled around along the rear surface, the left side surface, and the front surface of the case body 17. The circuit board 11 is also pulled out from the left end part of the front surface of the cover member 18 to the front side. The circuit board 11 is fixed to the outer peripheral surface of the case body 17.

In the optical unit 1, when a change in inclination of the movable body 3 is detected by a predetermined detection mechanism to detect the change in the inclination of the movable body 3, an electric current is supplied to at least either one of the first drive coil 25 and the second drive coil 27 on the basis of a detection result of the detection mechanism, and a shake is corrected. The magnetic drive mechanism 8 and the magnetic drive mechanism 9 rotate the movable body 3 with respect to the fixed body 5 by using at least either one of the first axis L1 and the second axis L2 as the rotation center.

Figure 4:
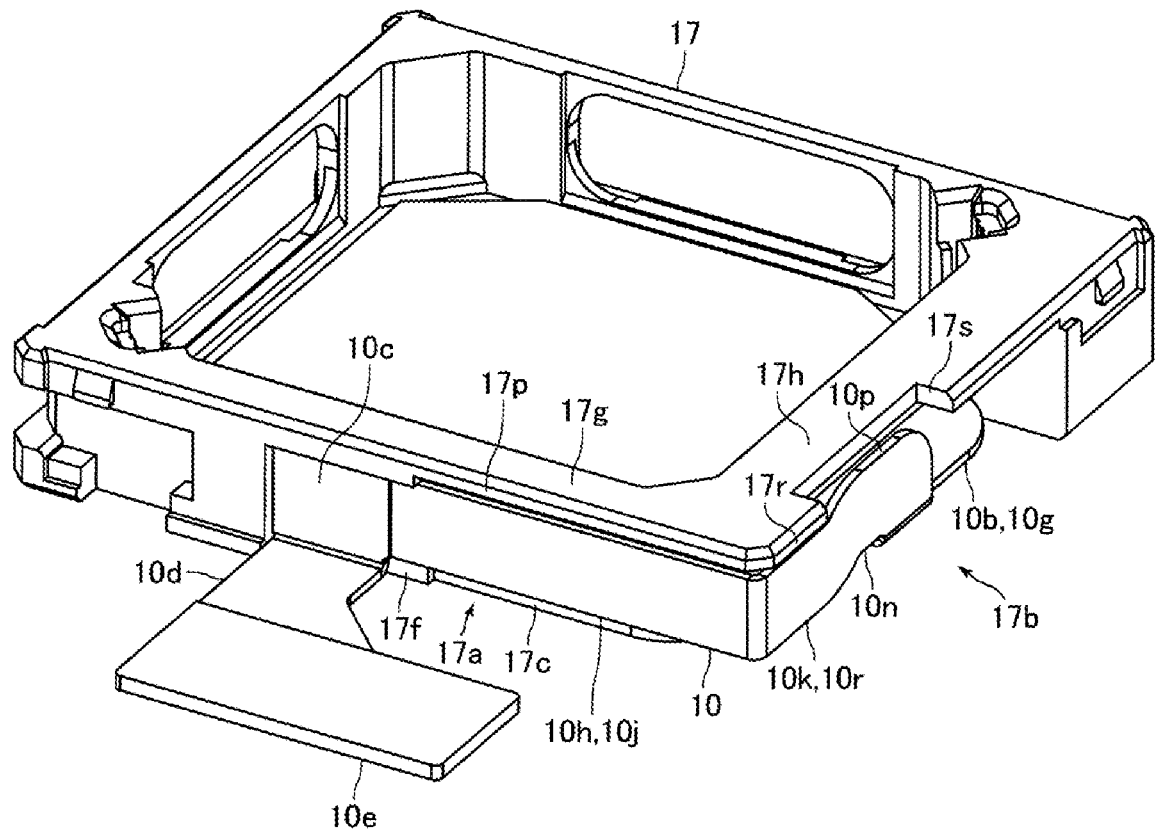
FIG. 4 is a perspective view illustrating a case body and a circuit board shown in FIG. 3, extracted.
Figure 5:
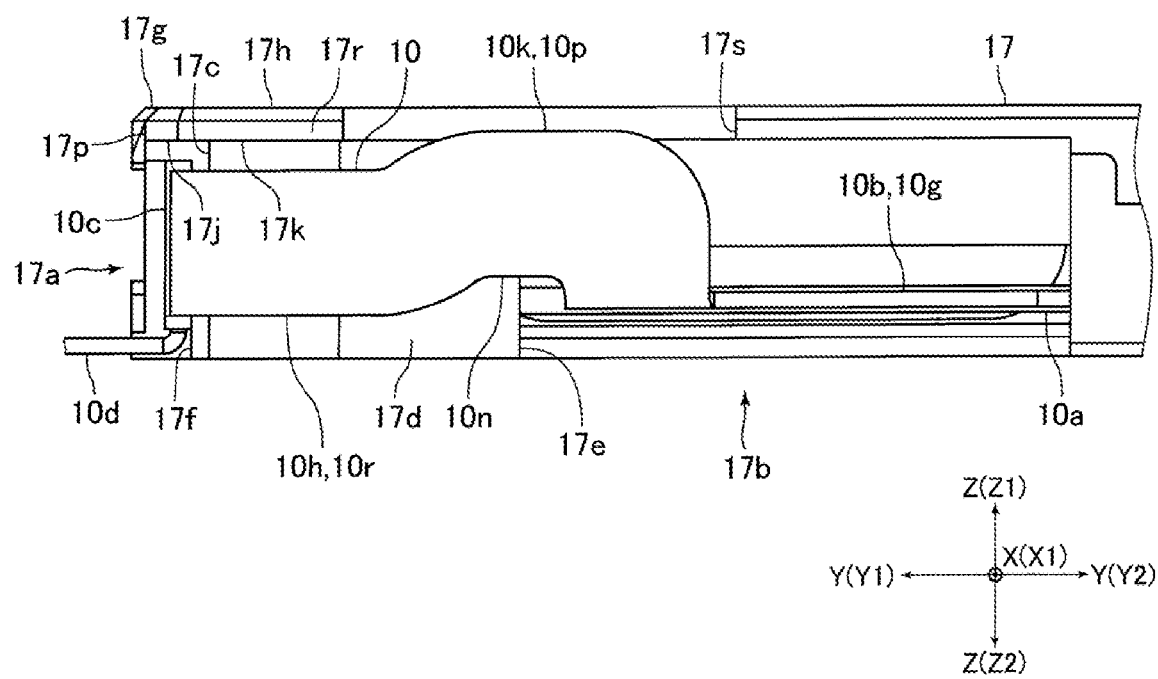
FIG. 5 is a side view illustrating a part of the case body and a part of the circuit board shown in FIG. 3, extracted.

FIG. 4 is a perspective view illustrating the case body 17 and the circuit board 10 shown in FIG. 3, extracted. FIG. 5 is a side view illustrating a part of the case body 17 and a part of the circuit board 10 shown in FIG. 3, extracted.

The circuit board 10 is a rigid flexible board in which a flexible printed circuit board and a rigid board are integrated. The circuit board 10 is constituted by a first board portion 10a that is mounted on an end surface on the subject side of the camera module 2 (that is, a lower end surface of the camera module 2), a second board portion 10b having one end part connected to the first board portion 10a, a third board portion 10c connected to the other end part of the second board portion 10b, a fourth board portion 10d having one end part connected to the third board portion 10c, and a fifth board portion 10e connected to the other end part of the fourth board portion 10d.

The first board portion 10a, the second board portion 10b, the third board portion 10c, the fourth board portion 10d, and the fifth board portion 10e are provided integrally. The first board portion 10a, the third board portion 10c, and the fifth board portion 10e are constituted by a flexible printed circuit board and a rigid board. The second board portion 10b and the fourth board portion 10d are constituted by a flexible printed circuit board.

As described above, when viewed from the up-down direction, two sides of the four sides that constitute the outer peripheral surface of the case body 17 are parallel to the left and right directions, while the remaining two sides are parallel to the front-back direction. In the following explanation, one side of the two sides of the case body 17 parallel to the left-right direction is referred to as a first side 17a, and one of the two sides of the case body 17 parallel to the front-back direction is referred to as a second side 17b. Specifically, the side on the front side of the case body 17 when viewed from the up-down direction is the first side 17a, and the side on the right side of the case body 17 when viewed from the up-down direction is the second side 17b.

The first board portion 10a is mounted on the lower end surface of the camera module 2, as described above. The first board portion 10a is disposed so that a thickness direction of the first board portion 10a matches the up-down direction. An image pickup element is mounted on an upper surface of the first board portion 10a. The first board portion 10a in this embodiment is a module mounting portion. The second board portion 10b is pulled out from the first board portion 10a. The second board portion 10b is pulled out from the first board portion 10a toward the right side, pulled around toward the front side and then, pulled around toward the left side. The second board portion 10b is not fixed to the case body 17.

The second board portion 10b is constituted by a drawer portion 10g having a left end part connected to the first board portion 10a and a band-shaped portion 10h having a rear end part (one end part) connected to a right end part of the drawer portion 10g. As described above, since the second board portion 10b is constituted by a flexible printed circuit board, the drawer portion 10g and the band-shaped portion 10h are constituted by flexible printed circuit boards. In the second board portion 10b, two pieces of two-layer flexible printed circuit boards with wiring patterns provided on both surfaces overlap each other through a gap.

The drawer portion 10g is disposed so that a thickness direction of the drawer portion 10g matches the up-down direction. The drawer portion 10g is pulled out from the first board portion 10a to the outer peripheral side of the camera module 2. Specifically, the drawer portion 10g is pulled out from the first board portion 10a on the second side 17b to the right side, which is one side in the left-right direction. On a boundary between the drawer portion 10g and the band-shaped portion 10h, the second board portion 10b is bent by 90° toward the upper side. That is, on the boundary between the drawer portion 10g and the band-shaped portion 10h, the circuit board 10 is bent by 90°.

The band-shaped portion 10h is provided having an elongated band shape. The band-shaped portion 10h is disposed so that the width direction of the band-shaped portion 10h matches the up-down direction. In other words, when the optical axis L of the camera module 2 is at the reference position, the optical axis direction of the camera module 2 is parallel to the width direction of the band-shaped portion 10h. The band-shaped portion 10h is pulled around on the outer peripheral side of the case body 17 and on the inner peripheral side of the cylinder portion 18b of the cover member 18. Moreover, the band-shaped portion 10h is pulled around along the first side 17a and the second side 17b. In other words, the band-shaped portion 10h in a standing state is pulled around along the first side 17a and the second side 17b.

Supposing that a part of the band-shaped portion 10h that is pulled around along the first side 17a is a first band-shaped portion 10j, and a part of the band-shaped portion 10h that is pulled around along the second side 17b is a second band-shaped portion 10k, the band-shaped portion 10h is constituted by the first band-shaped portion 10j and the second band-shaped portion 10k and is bent by 90° toward the left side on the front end of the second side 17b. The second band-shaped portion 10k is pulled around to the end part on the first side 17a side on the second side 17b (that is, the front end part of the second side 17b). The first band-shaped portion 10j is pulled around to a center part of the first side 17a (center part in the left-right direction) from the end part on the second side 17b side of the first side 17a (that is, the right end part of the first side 17a). The thickness direction of the first band-shaped portion 10j substantially matches the front-back direction, and the thickness direction of the second band-shaped portion 10k substantially matches the front-back direction.

On the boundary between the first band-shaped portion 10j and the second band-shaped portion 10k, a thin reinforcing plate 30 to maintain the shape of the band-shaped portion 10h is fixed (see FIG. 2). The reinforcing plate 30 is provided having an L shape. Similarly, also on a boundary between the drawer portion 10g and the band-shaped portion 10h, a thin reinforcing plate (not shown) to maintain the shape of the second board portion 10b is fixed. In drawings other than FIG. 2, the reinforcing plate 30 is not shown.

On the front side of the boundary between the drawer portion 10g and the band-shaped portion 10h, a relief portion 10n to bend the second board portion 10b by 90° is provided. Therefore, supposing that a part of the second band-shaped portion 10k on the drawer portion 10g side (that is, the rear-side part of the second band-shaped portion 10k) is a base-end side second band-shaped portion 10p, and a part of the second band-shaped portion 10k on the first band-shaped portion 10j side (front-side part of the second band-shaped portion 10k) is a distal-end side second band-shaped portion 10r, an upper end surface of the base-end side second band-shaped portion 10p (end surface on the subject side) is disposed closer to the upper side (subject side) than an upper end surface of the distal-end side second band-shaped portion 10r (end surface on the subject side). The relief portion 10n is recessed upward from the lower end surface of the base-end side second band-shaped portion 10p.

The third board portion 10c is disposed so that the thickness direction of the third board portion 10c matches the front-back direction. The third board portion 10c is fixed to the outer peripheral surface of the case body 17. Specifically, the third board portion 10c is fixed to the outer peripheral surface of the case body 17 on the first side 17a. More specifically, the third board portion 10c is fixed to the outer peripheral surface of the case body 17 at the center part of the first side 17a (center part in the left-right direction). A right end part of the third board portion 10c is connected to a left end part of the first band-shaped portion 10j. The third board portion 10c in this embodiment is a fixed portion, which is connected to the other end part of the band-shaped portion 10h and fixed to the outer peripheral surface of the case body 17.

The fourth board portion 10d is pulled out from the third board portion 10c to the front side. The fourth board portion 10d is disposed so that a thickness direction of the fourth board portion 10d matches the up-down direction. A rear end part of the fourth board portion 10d is connected to a lower end part of the third board portion 10c. The fourth board portion 10d is pulled out from the center part of the first side 17a toward the front side and is pulled out toward the outer peripheral side of the fixed body 5. The fifth board portion 10e is disposed so that a thickness direction of the fifth board portion 10e matches the up-down direction. The fifth board portion 10e is connected to a front end part of the fourth board portion 10d. The fifth board portion 10e is connected to a connector provided inside a mobile device such as a smartphone or the like on which the optical unit 1 is mounted.

In this embodiment, the drawer portion 10g to which one end part of the band-shaped portion 10h is connected is pulled out from the first board portion 10a mounted on the lower end surface of the camera module 2 toward the right side on the second side 17b, and the third board portion 10c connected to the other end part of the band-shaped portion 10h is fixed to the outer peripheral surface of the case body 17 on the first side 17a and thus, the second band-shaped portion 10k disposed along the second side 17b moves relatively largely with the operation of the camera module 2 when the shake correction is performed in the pitching direction or the yawing direction, but the first band-shaped portion 10j disposed along the first side 17a does not move as largely as the second band-shaped portion 10k. The second band-shaped portion 10k moves mainly in the up-down direction and the left-right direction with the operation of the camera module 2 when the shake correction is performed in the pitching direction or the yawing direction, while the first band-shaped portion 10j moves mainly in the up-down direction.

Figure 6:
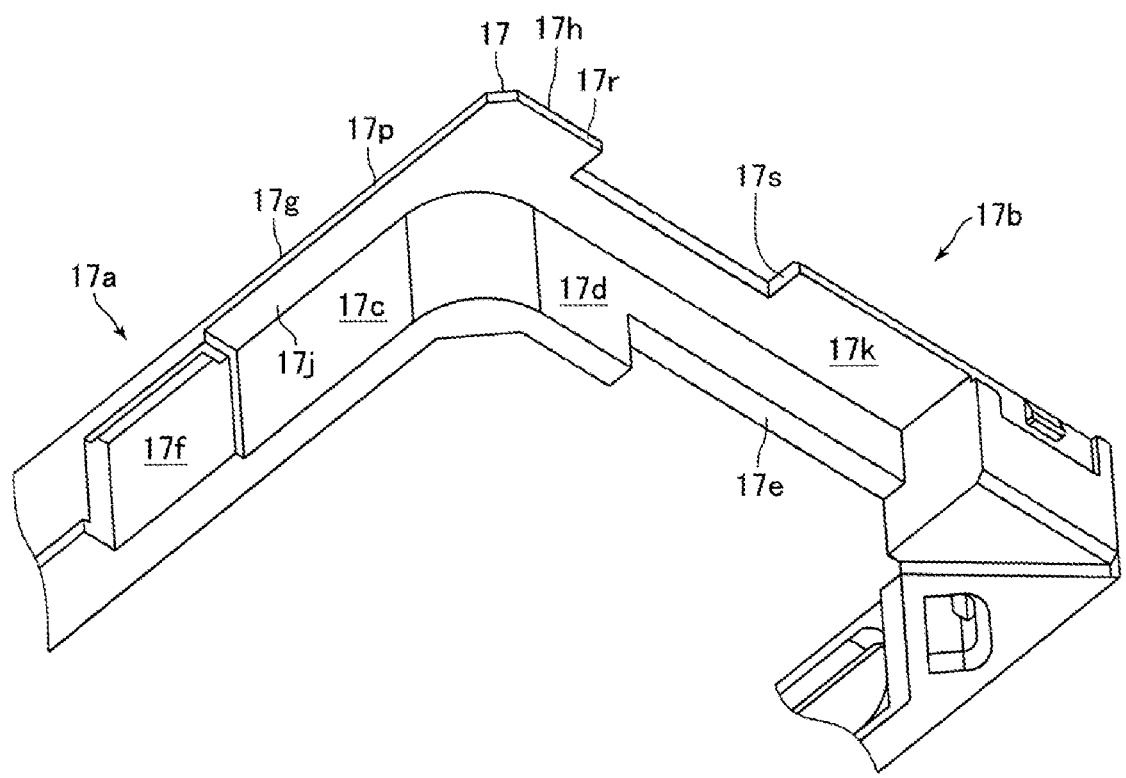
FIG. 6 is a perspective view illustrating a part of the case body shown in FIG. 3 from a lower side.
Figure 7:
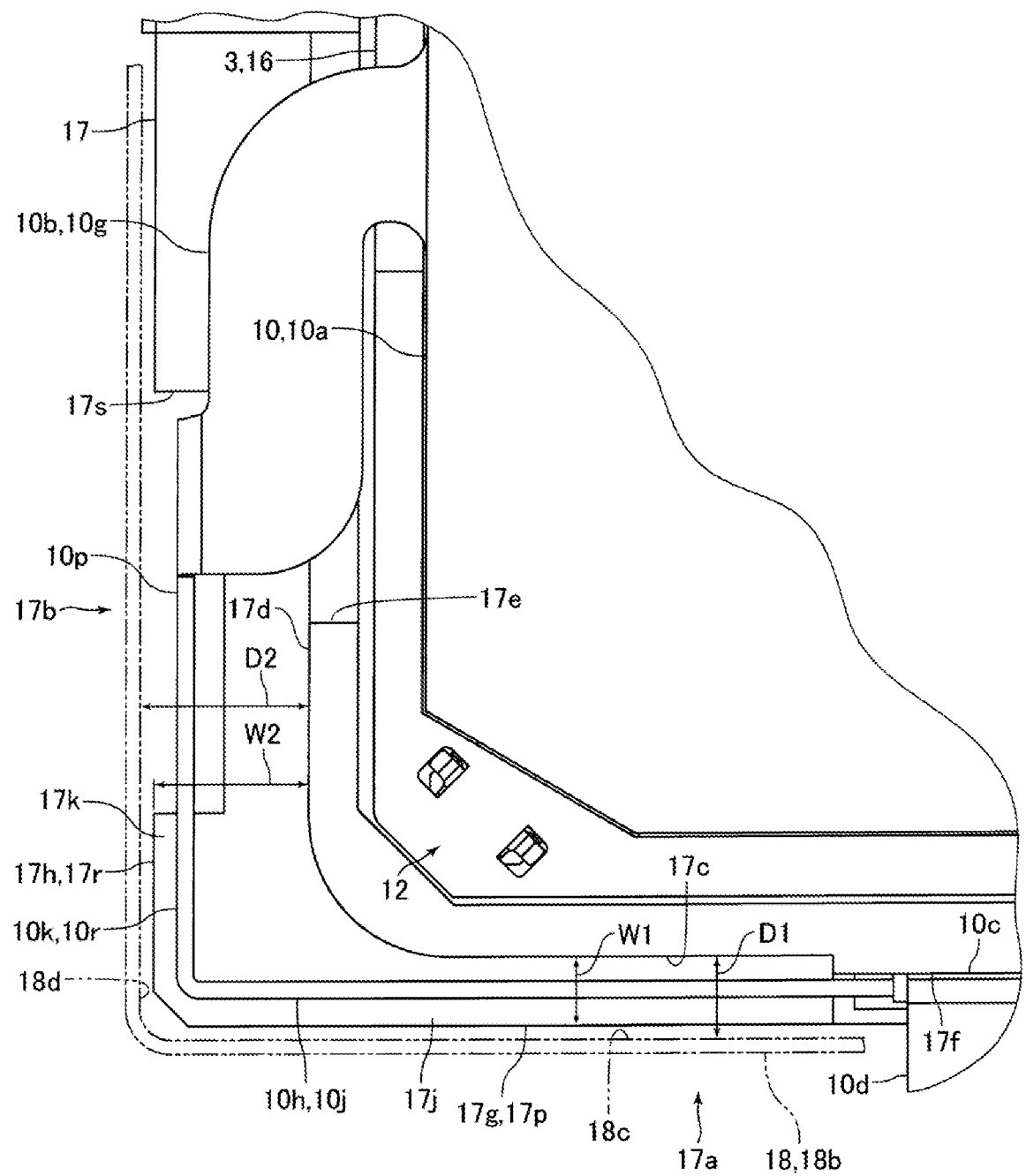
FIG. 7 is an enlarged diagram for explaining a configuration of a part E in FIG. 3.

FIG. 6 is a perspective view illustrating a part of the case body 17 shown in FIG. 3 from a lower side. FIG. 7 is an enlarged diagram for explaining a configuration of a part E in FIG. 3.

As described above, the case body 17 is provided having a flat square-cylinder shape with openings at both ends in the up-down direction. Moreover, the first band-shaped portion 10j is pulled around along the first side 17a of the case body 17, and the second band-shaped portion 10k is pulled around along the second side 17b of the case body 17. In the case body 17, a first inner-side wall surface 17c disposed on an inner side of the first band-shaped portion 10j in the front-back direction and a second inner-side wall surface 17d disposed on an inner side of the second band-shaped portion 10k in the left-right direction are defined. In other words, in the case body 17, the first inner-side wall surface 17c disposed on a rear side of the first band-shaped portion 10j and the second inner-side wall surface 17d disposed on a left side of the second band-shaped portion 10k are defined.

The first inner-side wall surface 17c is provided having a planar shape orthogonal to the front-back direction. The second inner-side wall surface 17d is provided having a planar shape orthogonal to the left-right direction. That is, the first inner-side wall surface 17c is a plane orthogonal to the front-back direction, and the second inner-side wall surface 17d is a plane orthogonal to the left-right direction. The right end of the first inner-side wall surface 17c is connected to the front end of the second inner-side wall surface 17d via a convex curved surface. A gap is defined between the first band-shaped portion 10j and the first inner-side wall surface 17c, and a gap is defined between the second band-shaped portion 10k and the second inner-side wall surface 17d.

The first inner-side wall surface 17c is defined on the front-side part of the case body 17, and the second inner-side wall surface 17d is defined on the right side part of the case body 17. On the right-side part of the case body 17, a notch portion 17e to pull out the drawer portion 10g is provided.

On the left side of the first inner-side wall surface 17c, a fixing surface 17f to which the third board portion 10c is fixed is defined. The fixing surface 17f is a plane orthogonal to the front-back direction.

The case body 17 includes a first upper-wall portion 17g disposed on the upper side of the first band-shaped portion 10j and a second upper-wall portion 17h disposed on the upper side of the second band-shaped portion 10k. That is, the case body 17 includes the first upper-wall portion 17g disposed on the subject side of the first band-shaped portion 10j and the second upper-wall portion 17h disposed on the subject side of the second band-shaped portion 10k. The upper surface of the first upper-wall portion 17g constitutes a part of the upper surface of the case body 17. The upper surface of the second upper-wall portion 17h constitutes a part of the upper surface of the case body 17.

A lower surface (surface on the counter-subject side) of the first upper-wall portion 17g is connected to an upper end part (end part on the subject side) of the first inner-side wall surface 17c and extends toward an outer side in the front-back direction so as to form the first upper-side wall surface 17j that covers the first band-shaped portion 10j from the upper side. The lower surface (surface on the counter-subject side) of the second upper-wall portion 17h is connected to the upper end part of the second inner-side wall surface 17d and extends toward an outer side in the left-right direction so as to form a second upper-side wall surface 17k that covers the second band-shaped portion 10k from the upper side. That is, the case body 17 includes the first upper-wall portion 17g on which the first upper-side wall surface 17j extending from the upper end part of the first inner-side wall surface 17c to the front side is defined, and the second upper-wall portion 17h on which the second upper-side wall surface 17k extending from the upper end part of the second inner-side wall surface 17d to the right side is defined.

The first upper-side wall surface 17j and the second upper-side wall surface 17k are provided having planar shapes orthogonal to the up-down direction. That is, the first upper-side wall surface 17j and the second inner-side wall surface 17d are planes orthogonal to the up-down direction. A front end surface (that is, the end surface on the outer side of the first upper-wall portion 17g in the front-back direction) 17p of the first upper-wall portion 17g is a plane orthogonal to the front-back direction. A right end surface (that is, the end surface on the outer side of the second upper-wall portion 17h in the left-right direction) 17r of the second upper-wall portion 17h is a plane orthogonal to the left-right direction.

In the second upper-wall portion 17h, a notch portion 17s to prevent interference between the base-end side second band-shaped portion 10p and the second upper-wall portion 17h is provided. The notch portion 17s penetrates the second upper-wall portion 17h in the up-down direction. Moreover, the notch portion 17s is provided from the right end surface 17r of the second upper-wall portion 17h toward the left side. The notch portion 17s is covered from above by the covering portion 19a of the cover member 19. The upper end part of the base-end side second band-shaped portion 10p is disposed in the notch portion 17s. The upper end of the base-end side second band-shaped portion 10p is disposed closer to the lower side than the upper surface of the second upper-wall portion 17h (that is, the upper surface of the case body 17). A gap is defined between the upper end of the distal-end side second band-shaped portion 10r and the second upper-side wall surface 17k. A gap is defined between the upper end of the first band-shaped portion 10*j* and the first upper-side wall surface 17*j*.

As described above, the cover member 18 has a square-cylindrical cylinder portion 18*b*, and the cylinder portion 18*b* covers the outer peripheral side of the case body 17. As shown in FIG. 7, in the cover member 18, a first outer-side wall surface 18*c* disposed on the outer side of the first band-shaped portion 10*j* in the front-back direction, and a second outer-side wall surface 18*d* disposed on the outer side of the second band-shaped portion 10*k* in the left-right direction are defined. That is, in the cover member 18, the first outer-side wall surface 18*c* disposed on the front side of the first band-shaped portion 10*j* and the second outer-side wall surface 18*d* disposed on the right side of the second band-shaped portion 10*k* are defined.

The first outer-side wall surface 18*c* is provided having a planar shape orthogonal to the front-back direction. The second outer-side wall surface 18*d* is provided having a planar shape orthogonal to the left-right direction. That is, the first outer-side wall surface 18*c* is a plane orthogonal to the front-back direction, and the second outer-side wall surface 18*d* is a plane orthogonal to the left-right direction. Moreover, the first outer-side wall surface 18*c* is parallel to the first inner-side wall surface 17*c*, and the second outer-side wall surface 18*d* is parallel to the second inner-side wall surface 17*d*. The right end of the first outer-side wall surface 18*c* is connected to the front end of the second outer-side wall surface 18*d* via a concave curved surface. A gap is defined between the first band-shaped portion 10*j* and the first outer-side wall surface 18*c*, and a gap is defined between the second band-shaped portion 10*k* and the second outer-side wall surface 18*d*.

On lower sides of the first band-shaped portion 10*j* and the second band-shaped portion 10*k*, the bottom portion 18*a* of the cover member 18 is disposed. A gap is defined between the lower end of the first band-shaped portion 10*j* and the upper surface of the bottom portion 18*a*. A gap is defined also between the lower end of the second band-shaped portion 10*k* and the upper surface of the bottom portion 18*a*. On the front surface part of the cover member 18, notch portions 18*e*, 18*f* to pull out the circuit boards 10, 11 to the outer peripheral side of the optical unit 1 are provided. The circuit board 10 is pulled out so as to pass the notch portion 18*e*. The circuit board 11 is pulled out so as to pass the notch portion 18*f*.

As described above, the front end surface 17*p* of the first upper-wall portion 17*g* is a plane orthogonal to the front-back direction and is parallel to the first outer-side wall surface 18*c*. Moreover, the right end surface 17*r* of the second upper-wall portion 17*h* is a plane orthogonal to the left-right direction and is parallel to the second outer-side wall surface 18*d*. The front end surface 17*p* is in contact with a rear surface of the front surface portion 19*b* of the cover member 19, and the first outer-side wall surface 18*c* is in contact with the front surface of the front surface portion 19*b*. The right end surface 17*r* is in contact with a left surface of the right surface portion 19*c* of the cover member 19, and the second outer-side wall surface 18*d* is in contact with the right surface of the right surface portion 19*c*.

The case body 17 and the cover members 18, 19 serve a function to protect the band-shaped portion 10*h* in the front-back/left-right direction and the up-down direction. As shown in FIG. 7, an interval D1 between the first inner-side wall surface 17*c* and the first outer-side wall surface 18*c* in the front-back direction is smaller than an interval D2 between the second inner-side wall surface 17*d* and the second outer-side wall surface 18*d* in the left-right direction.

Moreover, a width W1 of the first upper-side wall surface 17*j* in the front-back direction is smaller than a width W2 of the second upper-side wall surface 17*k* in the left-right direction.

When a shake correction is performed in the pitching direction or the yawing direction, the band-shaped portion 10*h* moves with the operation of the camera module 2. In this embodiment, the gap between the first band-shaped portion 10*j* and the first inner-side wall surface 17*c* and the gap between the first band-shaped portion 10*j* and the first outer-side wall surface 18*c* are set so that, even if the band-shaped portion 10*h* moves at the shake correction, the first band-shaped portion 10*j* is not brought into contact with the first inner-side wall surface 17*c* and the first outer-side wall surface 18*c*. Moreover, the gap between the second band-shaped portion 10*k* and the second inner-side wall surface 17*d* and the gap between the second band-shaped portion 10*k* and the second outer-side wall surface 18*d* are set so that, even if the band-shaped portion 10*h* moves at the shake correction, the second band-shaped portion 10*k* is not brought into contact with the second inner-side wall surface 17*d* and the second outer-side wall surface 18*d*.

Moreover, the gap between the upper end of the first band-shaped portion 10*j* and the first upper-side wall surface 17*j* and the gap between the lower end of the first band-shaped portion 10*j* and the upper surface of the bottom portion 18*a* are set so that, even if the band-shaped portion 10*h* moves at the shake correction, the first band-shaped portion 10*j* is not brought into contact with the first upper-side wall surface 17*j* and the bottom portion 18*a*. Moreover, the gap between the lower end of the second band-shaped portion 10*k* and the upper surface of the bottom portion 18*a* is set so that, even if the band-shaped portion 10*h* moves at the shake correction, the second band-shaped portion 10*k* is not brought into contact with the bottom portion 18*a*.

Moreover, the gap between the upper end of the distal-end side second band-shaped portion 10*r* and the second upper-side wall surface 17*k* is set so that, even if the band-shaped portion 10*h* moves at the shake correction, the distal-end side second band-shaped portion 10*r* is not brought into contact with the second upper-side wall surface 17*k*. Moreover, in this embodiment, the band-shaped portion 10*h* and the second upper-wall portion 17*h* are disposed so that, even if the band-shaped portion 10*h* moves at the shake correction, the upper end of the base-end side second band-shaped portion 10*p* does not reach the upper surface of the second upper-wall portion 17*h*. That is, the band-shaped portion 10*h* and the second upper-wall portion 17*h* are disposed so that, even if the band-shaped portion 10*h* moves at the shake correction, the upper end of the base-end side second band-shaped portion 10*p* is not brought into contact with the lower surface of the covering portion 19*a* of the cover member 19.

As described above, in this embodiment, the interval D1 between the first inner-side wall surface 17*c* and the first outer-side wall surface 18*c* in the front-back direction is smaller than the interval D2 between the second inner-side wall surface 17*d* and the second outer-side wall surface 18*d* in the left-right direction. Thus, in this embodiment, as compared with a case in which the interval D1 has the same interval as the interval D2, the optical unit 1 is able to be made smaller in the front-back direction.

In this embodiment, the interval D2 is wider than the interval D1, and the interval D2 between the second inner-side wall surface 17*d* and the second outer-side wall surface 18*d* in the left-right direction is relatively large and thus, even if the second band-shaped portion 10*k* largely moves with the operation of the camera module 2 when the shake correction is performed in the pitching direction or the yawing direction, the gap between the second band-shaped portion 10k and the second inner-side wall surface 17d and the gap between the second band-shaped portion 10k and the second outer-side wall surface 18d are able to be set so that the second band-shaped portion 10k is not brought into contact with the second inner-side wall surface 17d and the second outer-side wall surface 18d, as described above. Therefore, in this embodiment, damage on the second band-shaped portion 10k is able to be prevented. Specifically, damage on the second band-shaped portion 10k caused by repeated contact of the second band-shaped portion 10k with the second inner-side wall surface 17d or the second outer-side wall surface 18d is able to be prevented.

Furthermore, in this embodiment, since the first band-shaped portion 10j does not move as largely as the second band-shaped portion 10k with the operation of the camera module 2 when the shake correction is performed in the pitching direction or the yawing direction, even if the interval D1 is smaller than the interval D2, the gap between the first band-shaped portion 10j and the first inner-side wall surface 17c and the gap between the first band-shaped portion 10j and the first outer-side wall surface 18c are able to be set so that the first band-shaped portion 10j is not brought into contact with the first inner-side wall surface 17c and the first outer-side wall surface 18c, when the first band-shaped portion 10j moves with the operation of the camera module 2 when the shake correction is performed as described above. Therefore, in this embodiment, damage on the first band-shaped portion 10j is able to be prevented. Specifically, damage on the first band-shaped portion 10j caused by repeated contact of the first band-shaped portion 10j with the first inner-side wall surface 17c or the first outer-side wall surface 18c is able to be prevented.

As described above, in this embodiment, damage on the first band-shaped portion 10j and the second band-shaped portion 10k is able to be prevented, while the optical unit 1 is reduced in size in the front-back direction. Therefore, in this embodiment, damage on the circuit board 10 pulled out from the camera module 2 is able to be prevented, while the optical unit 1 is reduced in size.

In this embodiment, in the second upper-wall portion 17h, the notch portion 17s to prevent interference between the base-end side second band-shaped portion 10p and the second upper-wall portion 17h is provided. Thus, in this embodiment, even if the upper end surface of the base-end side second band-shaped portion 10p is disposed closer to the upper side than the upper end surface of the distal-end side second band-shaped portion 10r, the interference between the base-end side second band-shaped portion 10p and the second upper-wall portion 17h is able to be prevented, while a part on which the second upper-wall portion 17h is provided in the optical unit 1 is reduced in size in the up-down direction.

The embodiment described above is an example of a preferred embodiment of at least an embodiment of the disclosure but it is not limiting, and various modifications are able to be made within a range not changing the gist of at least an embodiment of the disclosure.

In the embodiment described above, at least any one of the first board portion 10a, the third board portion 10c, and the fifth board portion 10e may be constituted by a flexible printed circuit board. In other words, the entire circuit board 10 may be constituted by a flexible printed circuit board. Moreover, in the embodiment described above, at least either one of the second board portion 10b and the fourth board portion 10d may be constituted by a flexible printed board and a rigid board.

In the embodiment described above, the first board portion 10a, the second board portion 10b, the third board portion 10c, the fourth board portion 10d, and the fifth board portion 10e are provided integrally, but it may be so configured that the first board portion 10a is provided as a separate unit, and the first board portion 10a and the second board portion 10b are soldered and connected, for example. Also, for example, the second board portion 10b, the third board portion 10c, and the fourth board portion 10d may be provided separately, and the second board portion 10b and the fourth board portion 10d may be soldered and connected to the third board portion 10c.

In the embodiment described above, the first band-shaped portion 10j may be pulled around from the right end part of the first side 17a to the left end part of the first side 17a. In this case, the third board portion 10c is fixed to the outer peripheral surface of the case body 17 on the left end part of the first side 17a, and the circuit board 11 is pulled out from the front end part on the left surface of the cover member 18 toward the left side. Moreover, in the embodiment described above, the outer shape of the case body 17 may be rectangular when viewed from the up-down direction. In this case, the outer shape of the cover member 18 when viewed from the up-down direction is also rectangular.

In the embodiment described above, the optical unit 1 may include a rotation mechanism to rotate the camera module 2 with respect to the intermediate member 4 with the optical axis L of the camera module 2 as the rotation center. In this case, the rotation mechanism includes a drive coil mounted on the circuit board 11 and a drive magnet disposed to oppose the drive coil. Also, in this case, the intermediate member 4 includes a first intermediate member and a second intermediate member. The movable body 3 is rotatable with respect to the first intermediate member with the optical axis L of the camera module 2 as the rotation center, and the first intermediate member is rotatable with respect to the second intermediate member with the first axis L1 as the rotation center. Moreover, in the embodiment described above, the optical unit 1 may be mounted in various devices other than the mobile devices.

In the optical unit with a shake correction function of at least an embodiment of the disclosure, the circuit board pulled out from the camera module includes a band-shaped portion having an elongated band shape that is pulled around on an outer peripheral side of the intermediate-member holder rotatably holding the intermediate member and on an inner peripheral side of the outer-peripheral side covering portion covers the outer peripheral side of the intermediate-member holder, and the band-shaped portion is pulled around along the first side and the second side of the intermediate-member holder. Moreover, in at least an embodiment of the disclosure, supposing that a part of the band-shaped portion disposed along the first side is a first band-shaped portion and a part of the band-shaped portion disposed along the second side is a second band-shaped portion, on the intermediate-member holder, a planar-shaped first inner-side wall surface disposed on the inner side of the first band-shaped portion in the second direction and orthogonal to the second direction and a planar-shaped second inner-side wall surface disposed on the inner side of the second band-shaped portion in the first direction and orthogonal to the first direction are defined, and on the outer peripheral-side covering portion, a planar-shaped first outer-side wall surface disposed on the outer side of the first band-shaped portion in the second direction and parallel to the first inner-side wall surface and a planar-shaped second outer-side wall surface disposed on the outer side of the second band-shaped portion in the first direction and parallel to the second inner-side wall surface are defined.

Furthermore, in at least an embodiment of the disclosure, an interval between the first inner-side wall surface and the first outer-side wall surface in the second direction is smaller than an interval between the second inner-side wall surface and the second outer-side wall surface in the first direction. As described above, in at least an embodiment of the disclosure, the interval between the first inner-side wall surface and the first outer-side wall surface in the second direction is smaller than the interval between the second inner-side wall surface and the second outer-side wall surface in the first direction and thus, the optical unit with a shake correction function is able to be reduced in size in the second direction as compared with a case in which the interval between the first inner-side wall surface and the first outer-side wall surface in the second direction is the same as the interval between the second inner-side wall surface and the second outer-side wall surface in the first direction.

Furthermore, in at least an embodiment of the disclosure, the drawer portion to which one end part of the band-shaped portion is connected is pulled out from the module mounting portion mounted on the end surface on the counter-subject side of the camera module toward the one side in the first direction on the second side of the intermediate-member holder, and the fixed portion connected to the other end part of the band-shaped portion is fixed to the outer peripheral surface of the intermediate-member holder on the first side and thus, the second band-shaped portion disposed along the second side moves relatively largely with the operation of the camera module when the shake correction is performed in the pitching direction or the yawing direction, but the first band-shaped portion disposed along the first side does not move as largely as the second band-shaped portion.

Furthermore, in at least an embodiment of the disclosure, the interval between the second inner-side wall surface and the second outer-side wall surface in the first direction is larger than the interval between the first inner-side wall surface and the first outer-side wall surface in the second direction, and the interval between the second inner-side wall surface and the second outer-side wall surface in the first direction is relatively large and thus, even if the second band-shaped portion largely moves with the operation of the camera module when the shake correction is performed in the pitching direction or the yawing direction, contact of the second band-shaped portion disposed between the second inner-side wall surface and the second outer-side wall surface with the second inner-side wall surface and the second outer-side wall surface is able to be prevented. Therefore, in at least an embodiment of the disclosure, damage on the second band-shaped portion is able to be prevented. Specifically, damage on the second band-shaped portion caused by repeated contact of the second band-shaped portion with the second inner-side wall surface or the second outer-side wall surface is able to be prevented.

Furthermore, in at least an embodiment of the disclosure, since the first band-shaped portion does not move as largely as the second band-shaped portion with the operation of the camera module when the shake correction is performed in the pitching direction or the yawing direction, even if the interval between the first inner-side wall surface and the first outer-side wall surface in the second direction is smaller than the interval between the second inner-side wall surface and the second outer-side wall surface in the first direction, when the first band-shaped portion moves with the operation of the camera module when the shake correction is performed in the pitching direction or the yawing direction, contact of the first band-shaped portion disposed between the first inner-side wall surface and the first outer-side wall surface with the first inner-side wall surface and the first outer-side wall surface is able to be prevented. Therefore, in at least an embodiment of the disclosure, damage on the first band-shaped portion is able to be prevented. Specifically, the damage on the first band-shaped portion caused by repeated contact of the first band-shaped portion with the first inner-side wall surface or the first outer-side wall surface is able to be prevented.

As described above, in at least an embodiment of the disclosure, damage on the first band-shaped portion and the second band-shaped portion is able to be prevented, while the optical unit with a shake correction function is reduced in size in the second direction. Therefore, in at least an embodiment of the disclosure, damage on the circuit board pulled out from the camera module is able to be prevented, while the optical unit with a shake correction function is reduced in size.

In at least an embodiment of the disclosure, for example, the band-shaped portion is constituted by a flexible printed circuit board.

In at least an embodiment of the disclosure, for example, the intermediate-member holder has a first upper-wall portion disposed on the subject side of the first band-shaped portion and a second upper-wall portion disposed on the subject side of the second band-shaped portion, a surface on the counter-subject side of the first upper-wall portion is a first upper-side wall surface which has an end part on the subject side of the first inner-side wall surface connected thereto, extends toward an outer side in the second direction, and covers the first band-shaped portion from the subject side, a surface on the counter-subject side of the second upper-wall portion is a second upper-side wall surface which has an end part on the subject side of the second inner-side wall surface connected thereto, extends toward the outer side in the first direction, and covers the second band-shaped portion from the subject side, and an end surface on the outer side of the first upper-wall portion in the second direction is parallel to the first outer-side wall surface, an end surface on the outer side of the second upper-wall portion in the first direction is parallel to the second outer-side wall surface, and a width of the first upper-side wall surface in the second direction is smaller than a width of the second upper-side wall surface in the first direction.

In at least an embodiment of the disclosure, for example, the circuit board is bent by 90° on a boundary between the drawer portion and the band-shaped portion, and supposing that a part on the drawer portion side of the second band-shaped portion is a base-end side second band-shaped portion, and a part on the first band-shaped portion side of the second band-shaped portion is a distal-end side second band-shaped portion, an end surface on the subject side of the base-end side second band-shaped portion is disposed closer to the subject side than the end surface on the subject side of the distal-end side second band-shaped portion, and a notch portion to prevent interference between the base-end side second band-shaped portion and the second upper-wall portion is provided on the second upper-wall portion. In this case, even if the end surface on the subject side of the base-end side second band-shaped portion is disposed closer to the subject side than the end surface on the subject side of the distal-end side second band-shaped portion, the interference between the base-end side second band-shaped portion and the second upper-wall portion is able to be prevented, while a part on which the second upper-wall portion is provided in the optical direction of the camera module in the optical unit with a shake correction function is reduced in size.

In at least an embodiment of the disclosure, for example, the second band-shaped portion is pulled around to an end part on a side of the first side of the second side, the first band-shaped portion is pulled around from the end part on a side of the second side to a center part of the first side, and the fixed portion is fixed to the outer peripheral surface of the intermediate-member holder at the center part of the first side.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. An optical unit with a shake correction function, comprising:
a movable body having a camera module; an intermediate member rotatably holding the movable body; a fixed body rotatably holding the intermediate member; a magnetic drive mechanism to rotate the movable body with respect to the fixed body so that an optical axis of the camera module is inclined in an arbitrary direction; and a circuit board pulled out from the camera module, wherein
supposing that a direction orthogonal to the optical axis of the camera module disposed at a predetermined reference position is a first direction, a direction orthogonal to the optical axis of the camera module disposed at the reference position and the first direction is a second direction, one side in an optical axis direction being a direction of the optical axis of the camera module is a subject side, and a side opposite to the subject side is a counter-subject side;
the fixed body comprises an intermediate-member holder rotatably holding the intermediate member and an outer-peripheral side covering portion covering an outer peripheral side of the intermediate-member holder;
the circuit board comprises a module mounting portion mounted on an end surface on the counter-subject side of the camera module, a drawer portion pulled out from the module mounting portion to the outer peripheral side of the camera module, a band-shaped portion having an elongated band shape that is connected on one end part to the drawer portion and is pulled around on an outer peripheral side of the intermediate-member holder and an inner peripheral side of the outer-peripheral side covering portion, and a fixed portion connected to the other end part of the band-shaped portion and fixed to an outer peripheral surface of the intermediate-member holder;
when viewed from the optical axis direction of the camera module, when the optical axis of the camera module is at the reference position, an outer shape of the intermediate-member holder is a regular square or a rectangle, and four sides constituting the outer peripheral surface of the intermediate-member holder are parallel to the first direction or the second direction;
supposing that one side in the two sides of the intermediate-member holder parallel to the first direction is a first side, and one side in the two sides of the intermediate-member holder parallel to the second direction is a second side;
a width direction of the band-shaped portion is parallel to the optical axis direction when the optical axis of the camera module is at the reference position;
the drawer portion is pulled out from the module mounting portion toward the one side in the first direction on the second side;
the band-shaped portion is pulled around along the first side and the second side;
the fixed portion is fixed to the outer peripheral surface of the intermediate-member holder on the first side;
supposing that a part of the band-shaped portion disposed along the first side is a first band-shaped portion, and a part of the band-shaped portion disposed along the second side is a second band-shaped portion;
in the intermediate-member holder, a planar-shaped first inner-side wall surface disposed on an inner side of the first band-shaped portion in the second direction and orthogonal to the second direction and a planar-shaped second inner-side wall surface disposed on an inner side of the second band-shaped portion in the first direction and orthogonal to the first direction are defined;
on the outer-peripheral side covering portion, a planar-shaped first outer-side wall surface disposed on an outer side of the first band-shaped portion in the second direction and parallel to the first inner-side wall surface and a planar-shaped second outer-side wall surface disposed on an outer side of the second band-shaped portion in the first direction and parallel to the second inner-side wall surface are defined; and
an interval between the first inner-side wall surface and the first outer-side wall surface in the second direction is smaller than an interval between the second inner-side wall surface and the second outer-side wall surface in the first direction.

2. The optical unit with a shake correction function according to claim 1, wherein
the band-shaped portion is constituted by a flexible printed circuit board.

3. The optical unit with a shake correction function according to claim 1, wherein
the intermediate-member holder comprises a first upper-wall portion disposed on the subject side of the first band-shaped portion and a second upper-wall portion disposed on the subject side of the second band-shaped portion;
a surface on the counter-subject side of the first upper-wall portion is a first upper-side wall surface that has an end part on the subject side of the first inner-side wall surface connected thereto, extends toward an outer side in the second direction, and covers the first band-shaped portion from the subject side;
a surface on the counter-subject side of the second upper-wall portion is a second upper-side wall surface that has the end part on the subject side of the second inner-side wall surface connected thereto, extends toward an outer side in the first direction, and covers the second band-shaped portion from the subject side;
an end surface on an outer side of the first upper-wall portion in the second direction is parallel to the first outer-side wall surface;

an end surface on an outer side of the second upper-wall portion in the first direction is parallel to the second outer-side wall surface; and a width of the first upper-side wall surface in the second direction is smaller than a width of the second upper-side wall surface in the first direction.

4. The optical unit with a shake correction function according to claim 3, wherein the circuit board is bent by 90° on a boundary between the drawer portion and the band-shaped portion;

supposing that a part on the drawer portion side of the second band-shaped portion is a base-end side second band-shaped portion, and a part on the first band-shaped portion side of the second band-shaped portion is a distal-end side second band-shaped portion;

an end surface on the subject side of the base-end side second band-shaped portion is disposed closer to the subject side than an end surface on the subject side of the distal-end side second band-shaped portion; and a notch portion to prevent interference between the base-end side second band-shaped portion and the second upper-wall portion is provided on the second upper-wall portion.

5. The optical unit with a shake correction function according to claim 1, wherein the second band-shaped portion is pulled around to an end part on a side of the first side of the second side;

the first band-shaped portion is pulled around from the end part on a side of the second side of the first side to a center part of the first side; and the fixed portion is fixed to an outer peripheral surface of the intermediate-member holder at the center part of the first side.

* * * * *